United States Patent [19]
Friesen

[11] Patent Number: 5,178,507
[45] Date of Patent: Jan. 12, 1993

[54] DISCHARGE ARRANGEMENT FOR A TRANSPORT APPARATUS

[76] Inventor: Abraham S. Friesen, Box 121, R.R. #1, Morris, Manitoba, Canada, R0G 1K0

[21] Appl. No.: 756,541

[22] Filed: Sep. 9, 1991

[51] Int. Cl.⁵ .............................................. B65G 33/14
[52] U.S. Cl. .................................... 414/326; 414/288; 222/413
[58] Field of Search ............... 414/304, 324, 325, 326, 414/327, 243, 288, 287, 523, 526; 222/410, 411, 412, 413, 414, 415

[56] References Cited

U.S. PATENT DOCUMENTS

| | | | |
|---|---|---|---|
| 2,507,873 | 5/1950 | Ward | 414/288 X |
| 2,799,407 | 7/1957 | Vanier et al. | 414/326 |
| 3,085,673 | 4/1963 | Gooding | 414/288 |

FOREIGN PATENT DOCUMENTS 1202591 4/1986 Canada ............................... 414/326
1264151 1/1990 Canada .

Primary Examiner—Frank E. Werner
Attorney, Agent, or Firm—Adrian D. Battison; Stanley G. Ade; Murray E. Thrift

[57] ABSTRACT

A transport apparatus of the conventional type which includes a pair of hoppers mounted end to end on a support frame is modified by the provision of discharge augers extending from a position outside the hoppers on the underside of the hopper bottom upwardly and rearwardly therefrom to a discharge spout arrangement beyond a rear end wall of one of the hoppers. One of the augers therefore passes through the second hopper. One of the augers lies directly on the center line while the other is inclined away from the center line of the apparatus so that both discharge spouts of the augers are arranged equidistantly from the rear end wall and spaced slightly side to side.

16 Claims, 3 Drawing Sheets

DISCHARGE ARRANGEMENT FOR A TRANSPORT APPARATUS

BACKGROUND OF THE INVENTION

This invention relates to an apparatus which is used for transportation of particulate materials particularly seeds and fertilizer for use in a seeding operation.

Devices of this type are well known and comprise two containers each of which is rectangular in plan view with the containers being connected along one common side wall. Each of the containers has a hopper bottom so that the particulate material within the container collects towards the hopper bottom for discharge.

Conventionally devices of this type include a pair of augers for discharging the material from the hopper bottom. Each auger is mounted within the container and extends from a feed end of the auger flight at the hopper bottom generally upwardly and toward one corner of the container so that the auger tube exits from the container through an upper cover wall of the container. Conventionally the augers are inclined toward the common joining wall of the containers so that the discharge spout of each of the augers is arranged at one side of the containers above the common joining wall of the containers but is approximately at the mid point along the length of the structure.

The containers are mounted on a suitable frame structure so that the whole unit as an integral structure can be mounted upon a flat bed truck or within a truck box with the auger discharge spouts arranged at one side of the truck box and at a position approximately mid way along the length of the truck box.

Drill fill devices have been available for approximately ten years and the two discharge augers have conventionally always been arranged at this location and this arrangement has been found to be entirely satisfactory.

Generally the device is used by driving the truck alongside the seed drill or other equipment to be filled and then by connecting the discharge spout of the auger to the hopper on the seed drill. In some cases, however, this is becoming difficult in view of different configurations of equipment which are recently being employed.

A modified arrangement is shown in Canadian Patent 1,264,151 issued Jan. 22, 1990 in which the auger of a first one of the hoppers is modified so that it extends along the inside surface of the hopper bottom wall of the first hopper toward the common side wall between the two hoppers. It then extends through a tube formed in the second hopper passing from the common side wall to the cover wall of the second hopper. In this way, both augers emerge from the cover wall of the second hopper and are arranged adjacent one corner of the whole unit. This provides an improved configuration of the discharge spouts for use with particular configuration of seeding machines to be filled.

SUMMARY OF THE INVENTION

It is one objective of the present invention, therefore, to provide a further improved drill fill device of this general type which includes an alternative arrangement of the discharge augers which enables the device to be more easily used with different configurations of equipment to be filled.

According to one aspect of the invention, therefore, there is provided an apparatus for transporting particulate materials comprising a frame structure, a first and a second container mounted on the frame structure, each container having two parallel vertical end walls and two parallel vertical side walls arranged at right angles to the end walls, a hopper bottom connected at an upper edge of the hopper bottom to the side walls and end walls and a cover wall connected to upper edges of the side walls and end walls, the containers being joined to each other along one end wall of each of the containers so as to stand end to end on the frame structure and to define a common inner end wall and an outer end wall of each of the containers, a first discharge duct mounted relative to the first container so as to extend from a feed end of the duct at the hopper bottom of the first container to a discharge spout outside the first container, a second discharge duct mounted relative to the second container so as to extend from a feed end of the second duct at the hopper bottom of the second container to a discharge spout outside the second container, each of the first and second ducts having transport means mounted therein for moving material longitudinally of the duct from the feed end to the discharge spout, each of the first and second ducts being mounted such that the discharge spouts of the first and second ducts are located on a side of the outer end of the second container remote from the inner end wall.

According to a second aspect of the invention, therefore, there is provided an apparatus for transporting particulate materials comprising a frame structure, a first and a second container mounted on the frame structure, each container having two parallel vertical end walls and two parallel vertical side walls arranged at right angles to the end walls, a hopper bottom connected at an upper edge of the hopper bottom to the side walls and end walls and a cover wall connected to upper edges of the side walls and end walls, the containers being joined to each other along one end wall of each of the containers so as to stand end to end on the frame structure and to define a common inner end wall and an outer end wall of each of the containers, a first discharge duct mounted relative to the first container so as to extend from a feed end of the duct at the hopper bottom of the first container to a discharge spout outside the first container, a second discharge duct mounted relative to the second container so as to extend from a feed end of the second duct at the hopper bottom of the second container to a discharge spout outside the second container, each of the first and second ducts having transport means mounted therein for moving material longitudinally of the duct from the feed end to the discharge spout, each of the first and second ducts being mounted such that the discharge spouts of the first and second ducts are located on a side of the outer end of the second container remote from the inner end wall, the first duct extending from the feed end thereof on the outer surface of the hopper bottom of the first container through a side of the hopper bottom of the second container and through the outer end wall of the second container, the first duct being arranged such that the discharge spout thereof is arranged to one side of the discharge spout of the first duct, the discharge spouts of the first and second ducts being spaced from the end wall of the second container by substantially equal distances.

One or more embodiments of the invention will now be described in conjunction with the accompanying drawings.

BRIEF DESCRIPTION OF THE DRAWINGS

In the drawings like characters of reference indicate corresponding parts in the different figures.

DETAILED DESCRIPTION

Figure 1:
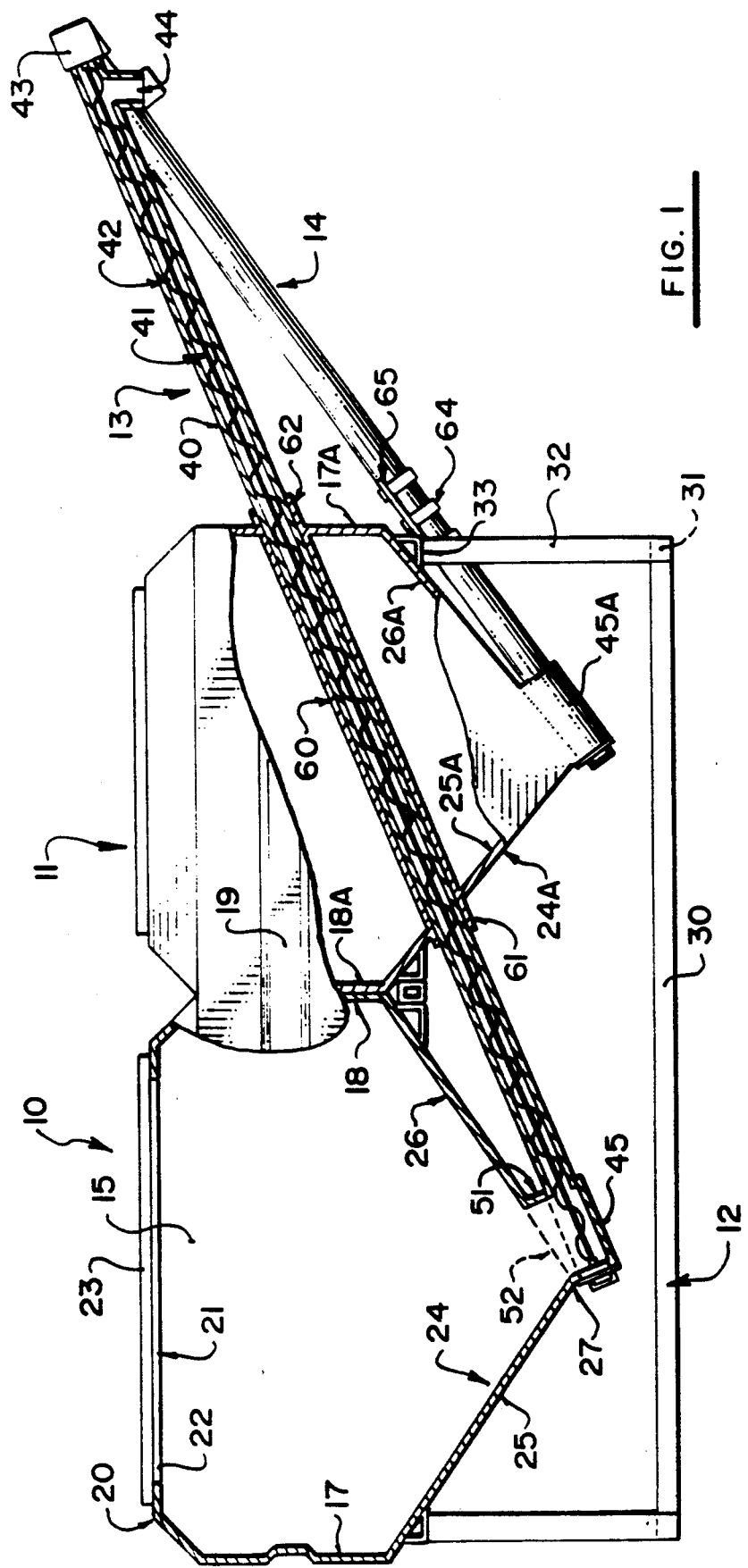
FIG. 1 is a side elevational view, partly in cross-section, of a transport apparatus according to the present invention.

The transport apparatus according to the present invention comprises a first container 10 and a second container 11 arranged end to end on a frame 12 for mounting upon a suitable vehicle for example the box of a grain truck or upon a flat bed truck. The transport container includes a first auger 13 and a second auger 14 for discharge of the material from each of the containers or hoppers 10 and 11 respectively.

Figure 2:
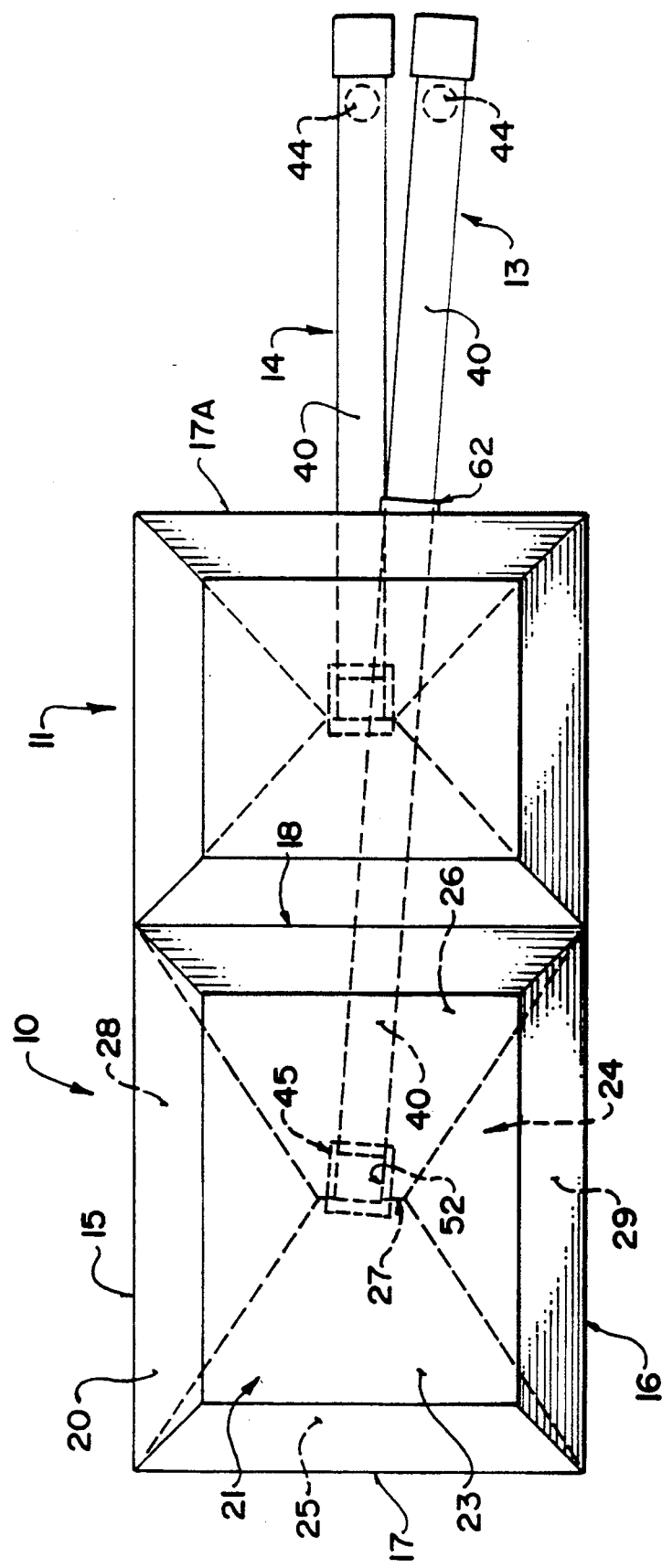
FIG. 2 is a top plan view of the apparatus of FIG. 1.

The hopper 10 is substantially rectangular in plan view including two vertical parallel side walls 15 and 16 and two vertical parallel end walls 17 and 18. Each of the side walls includes a horizontal recess 19 to provide an attractive appearance and to provide stiffness for the wall panel. The top edges of each of the side walls lies in a horizontal plane to which is attached a cover portion 20 which tapers upwardly and inwardly in the form of a pyramid to a flat top 21 including an opening 22 covered by a rectangular cover panel 23. The bottom edges of the side walls also lie in a common horizontal plane to which is attached a hopper bottom section generally indicated at 24. The hopper bottom section as best shown in FIG. 2 includes two trapezium shaped panels 25 and 26 which taper downwardly and inwardly from the lower edges of the end wall 17 and 18 respectively to a horizontal edge 27 forming the apex of a v-shape defined by the panels 25 and 26. The hopper bottom is further defined by two triangular panels 28 and 29 which extend from an apex at the v-shaped edge 27 upwardly and outwardly to connect with the lower edges of the side walls 15 and 16 respectively.

The hopper 11 is shaped substantially identically to the shape of the hopper 10 except that the side walls are slightly reduced in length so that the hopper 11 is of the same width as the hopper 10 as best shown in FIG. 2 but is shorter than the hopper 10 to provide a reduced volume. The hopper 11 has therefore end walls 17A and 18A together with a hopper bottom 24A including hopper bottom panels 25A and 26A.

The frame 12 includes a rectangular base defined by parallel side beams 30 and parallel end beams 31. The frame further includes four vertical posts 32 supporting a horizontal support frame including end beams 33 and parallel side beams 34. The hoppers 10 and 11 therefore sit on the support frame and are carried thereby.

Each of the discharge augers 13 and 14 includes a tube 40, a shaft 41 and a flight 42. A drive motor 43 is mounted at the upper end and arranged to drive the shaft 41 in rotation about the longitudinal axis of the tube 40 so as to rotate the flight to cause driving motion of the material longitudinally of the tube from a lower feed end to an upper discharge spout 44.

Figure 4:
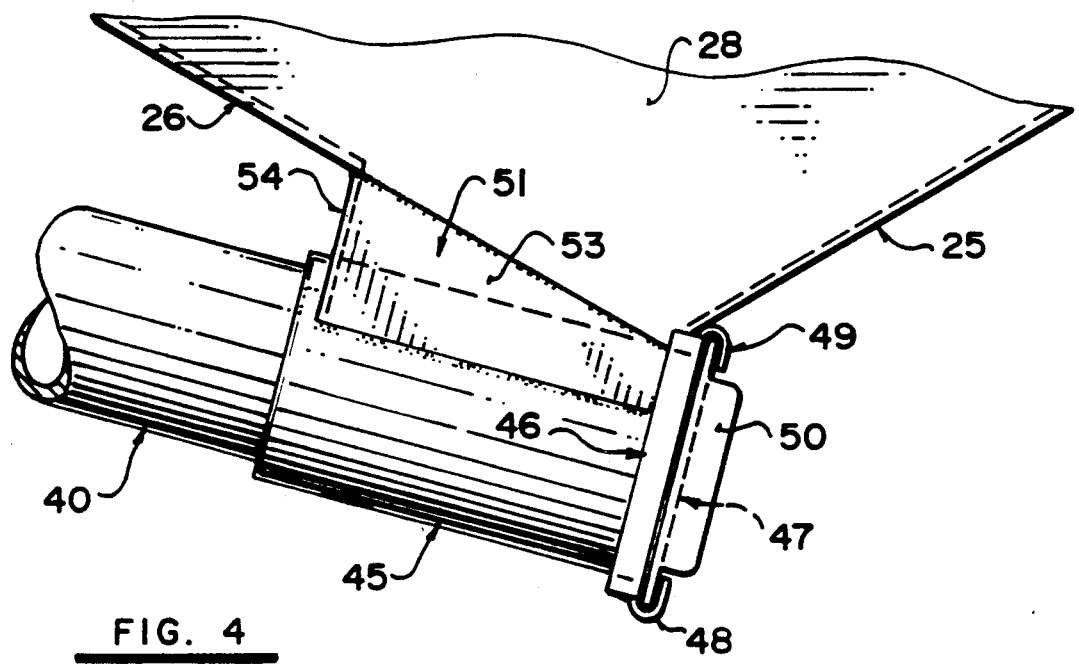
FIG. 4 is a side elevational view on an enlarged scale of a bottom portion of one of the hoppers of FIG. 1.

The feed end of the auger 13 communicates with the hopper bottom panel 26. As best shown in FIG. 4, the tube 40 connects with a cylindrical feed duct 45 which surrounds a lower end of the tube 40 and extends therefrom axially to cover and enclose a feed end of the flight 42. The axial end of the duct 45 is closed by an end plate member 46. The end plate member has a central opening through which material from the hopper can discharge when the central opening is exposed. The central opening is however normally closed by a closure plate 47 slidable within a slot defined by flanges 48 and 49 of the end member 46. The end plate 47 includes a handle 50 which can be manually grasped to slide the end plate 47 longitudinally of the slot for ready manual removal for discharge of material axially out from the end of the auger tube and the duct 45.

An upper part of the duct 45 is open and communicates through a coupling member 51 to an opening 52 at the lower part of the hopper bottom panel 26. The coupling member 51 includes side walls welded to the panel 26 on either side of the opening 52 and extending therefrom downwardly to a side face of the cylindrical duct 45 to which the panel is welded along weld line 53. The connection member 51 further includes a front face 54 extending upwardly from an end part of the duct 45 across between the side panels 55 and welded thereto and over the top of the duct 45 and also welded to the panel 26 at a position above the opening 52.

Material within the hopper can therefore simply discharge through the opening 52 into the duct 45 through the connection member 51.

From the connection member at the feed end of the auger, the auger 13 extends upwardly and rearwardly to the discharge spout 44. The auger 13 passes through the hopper 11 and is supported therein by a tube 60 extending through the hopper 11 from the hopper bottom panel 25A to the end wall 17A and defining collars 61 and 62 at the lower and upper ends thereof respectively. The auger 13 is thus wholly supported by its connection to the hopper 10 at the feed end thereof and by its support by the tube 60 at a mid section thereof leaving an upper part thereof cantilevered outwardly from the collar 62 upwardly to the discharge spout 44 and supported by the rigidity of the tube 40.

Figure 3:
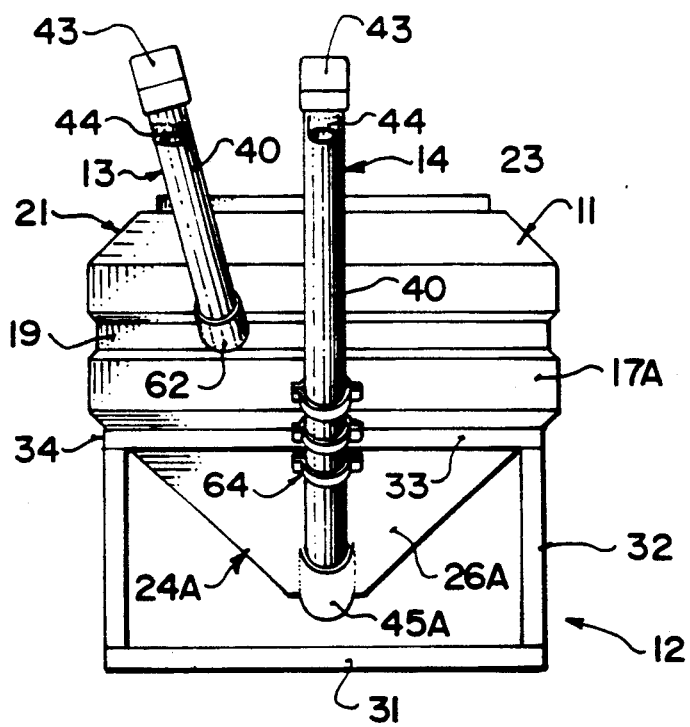
FIG. 3 is a rear elevational view of the apparatus of FIG. 1.

The auger 14 is connected to the lower end of the hopper bottom 24A of the hopper 11 in identical manner to that previously described in relation to the hopper 10. The auger 14 thus receives material escaping through an opening similar to the opening 52 provided in the hopper bottom panel 26A. The auger 14 extends upwardly and rearwardly from the feed end duct 45A upwardly and rearwardly underneath the cross beam 33 to which it is attached by a collar arrangement 64. The collar arrangement 64 includes three collar bands wrapped around the auger tube of the auger 14 and including a beam 65 extending along the upper side of the tube and attached to each of the collar bands and also attached to the cross beam 33 at the rear of the frame. The auger 14 is thus again cantilevered outwardly from the rear of the hopper 11 supported only by its connection to the hopper bottom of the hopper 11 and to the beam 33. As best shown in FIGS. 2 and 3, the auger 14 lies substantially along a centre line of the hoppers so as to extend directly rearwardly outwardly from the hopper 11 along that centre line. The auger 13 is however inclined slightly forwardly of the centre line so that it passes from the feed end thereof lying on the centre line slightly to one side of the centre line to terminate at the discharge spout thereof substantially coextensive from the end wall 17A but along one side of the discharge spout of the auger 14. This position is best shown in FIG. 2 where it will be noted that the discharge spout 44 of the auger 13 is arranged at a position alongside the discharge spout 44A of the auger 14. Material from each of the hoppers can therefore be discharged simply from this position downwardly through a discharge tube (not shown) of a flexible type into a container to be filled. As the discharge spouts are arranged at a position well rearwardly of the hoppers themselves, the system can be simply backed up to a container to be filled, for example a hopper of an air seeder, to a position where both of the discharge spouts are substantially directly above the air seeder for downward discharge into one or more hoppers provided on the air seeder.

In an alternative arrangement (not shown) the auger 14 can be replaced by an alternative form of transport device which again includes a transport tube for controlling the motion of the material to the discharge spout but instead of the auger flight the transport arrangement can be of a different type including a series of cups carried upon a longitudinal cable for transport of the material upwardly along the tube but without the damaging or crushing action which can occur an auger flight on delicate seeds such as peas, beans and lentils.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An apparatus for transporting particulate materials comprising a frame structure, a first and second container mounted on the frame structure, each container having two parallel vertical end walls and two parallel vertical side walls arranged at right angles to the end walls, a hopper bottom connected at an upper edge of the hopper bottom to the side walls and end walls and a cover wall connected to upper edges of the side walls and end walls, the containers being joined to each other along one end wall of each of the containers so as to stand end to end on the frame structure and to define a common inner end wall and an outer end wall of each of the containers, a first discharge duct mounted relative to the first container so as to extend from a feed end of the duct at the hopper bottom of the first container to a discharge spout outside the first container, a second discharge duct mounted relative to the second container so as to extend from a feed end of the second duct at the hopper bottom of the second container to a discharge spout outside the second container, each of the first and second ducts having transport means mounted therein for moving material longitudinally of the duct form the feed end to the discharge spout, each of the first and second ducts being mounted such that the discharge spouts of the first and second ducts are located on a side of the outer end wall of the second container remote from the inner end wall, wherein the first duct extends from the feed end thereof on an outer surface of the hopper bottom of the first container through a side of the hopper bottom of the second container and through the outer end wall of the second container.

2. Apparatus according to claim 1 wherein the second duct is connected to the second container on an outer surface of the hopper bottom thereof and extends upwardly and outwardly therefrom in a direction substantially parallel to one side surface of the hopper bottom to a position beyond the outer end wall thereof.

3. Apparatus according to claim 1 wherein the hopper bottom includes two side walls thereof converging downwardly and inwardly in a V-shape to an apex thereof and wherein the duct includes a tube having said feed end comprising an opening at a lower end of the tube on one side of the tube and connector means connecting the lower end of the tube to one side of the hopper bottom, said one side of the bottom hopper having an opening therethrough communicating through the connector means to the side opening of the tube.

4. Apparatus according to claim 3 wherein an end face of the tube is closed and is arranged substantially at the apex and wherein there is provided means defining an opening in the end face of the tube for cleaning out the tube.

5. Apparatus according to claim 1 wherein the transport means of the first duct comprises an auger flight mounted in the duct for rotation about a longitudinal axis thereof.

6. Apparatus according to claim 1 wherein each the transport means of the first and second ducts comprises an auger flight extending along the duct from the feed end thereof to the discharge spout thereof and rotatable about a longitudinal axis thereof.

7. An apparatus for transporting particulate materials comprising a frame structure, a first and a second container mounted on the frame structure, each container having two parallel vertical end walls and two parallel vertical side walls arranged at right angles to the end walls, a hopper bottom connected at an upper edge of the hopper bottom to the side walls and end walls and a cover wall connected to upper edges of the side walls and end walls, the containers being joined to each other along one end wall of each of the containers so as to stand end to end on the frame structure and to define a common inner end wall and an outer end wall of each of the containers, a first discharge duct mounted relative to the first container so as to extend from a feed end of the duct at the hopper bottom of the first container to a discharge spout outside the first container, a second discharge duct mounted relative to the second container so as to extend from a feed end of the second duct at the hopper bottom of the second container to a discharge spout outside the second container, each of the first and second ducts having transport means mounted therein for moving material longitudinally of the duct from the feed end to the discharge spout, each of the first and second ducts being mounted such that the discharge spouts of the first and second ducts are located on a side of the outer end wall of the second container remote from the inner end wall wherein the first duct is arranged such that the discharge spout thereof is arranged to one side of the discharge spout of the second duct and wherein the discharge spouts of the first and second ducts are spaced from the outer end wall of the second container by substantially equal distances.

8. An apparatus for transporting particulate materials comprising a frame structure, a first and a second container mounted on the frame structure, each container having two parallel vertical end walls and two parallel vertical side walls arranged at right angles to the end walls, a hopper bottom connected at an upper edge of the hopper bottom to the side walls and end walls and a cover wall connected to upper edges of the side walls and end walls, the containers being joined to each other along one end wall of each of the containers so as to stand end to end on the frame structure and to define a common inner end wall and an outer end wall of each of the containers, a first discharge duct mounted relative to the first container so as to extend from a feed end of the duct at the hopper bottom of the first container to a discharge spout outside the first container, a second discharge duct mounted relative to the second container so as to extend from a feed end of the second duct at the hopper bottom of the second container to a discharge spout outside the second container, each of the first and second ducts having transport means mounted therein for moving material longitudinally of the duct from the feed end to the discharge spout, each of the first and second ducts being mounted such that the discharge spouts of the first and second ducts are located on a side of the outer end wall of the second container remote from the inner end wall wherein the second duct lies substantially in a longitudinal vertical central plane of the containers and wherein the first duct is inclined outwardly from the central plane to one side of the central plane.

9. An apparatus for transporting particulate materials comprising a frame structure, a first and a second container mounted on the frame structure, each container having two parallel vertical end walls and two parallel vertical side walls arranged at right angles to the end walls, a hopper bottom connected at an upper edge of the hopper bottom to the side walls and end walls and a cover wall connected to upper edges of the side walls and end walls, the containers being joined to each other along one end wall of each of the containers so as to stand end to end on the frame structure and to define a common inner end wall and an outer end wall of each of the containers, a first discharge duct mounted relative to the first container so as to extend from a feed end of the duct at the hopper bottom of the first container to a discharge spout outside the first container, a second discharge duct mounted relative to the second container so as to extend from a feed end of the second duct at the hopper bottom of the second container to a discharge spout outside the second container, each of the first and second ducts having transport means mounted therein for moving material longitudinally of the duct from the feed end to the discharge spout, each of the first and second ducts being mounted such that the discharge spouts of the first and second ducts are located on a side of the outer end wall of the first duct extending from the feed end thereof on an outer surface of the hopper bottom of the first container through a side of the hopper bottom of the second container and through the outer end wall of the second container, the second duct being arranged such that the discharge spout thereof is arranged to one side of the discharge spout of the first duct, the discharge spouts of the first and second ducts being spaced from the end wall of the second container by substantially equal distances.

10. Apparatus according to claim 9 wherein the second duct lies substantially in a longitudinal vertical central plane of the containers and wherein the first duct is inclined so that it extends toward the discharge spout thereof outwardly from the central plane to one side thereof.

11. Apparatus according to claim 9 wherein the second duct is connected to the second container on an outer surface of the hopper bottom thereof and extends upwardly and outwardly therefrom in a direction substantially parallel to one side surface of the hopper bottom to a position beyond the outer end wall thereof.

12. Apparatus according to claim 9 wherein the hopper bottom includes two side walls thereof converging downwardly and inwardly in a V-shape to an apex thereof and wherein the duct includes a tube having said feed end comprising an opening at a lower end of the tube on one side of the tube and connector means connecting the lower end of the tube to one side of the hopper bottom, said one side of the bottom hopper having an opening therethrough communicating through the connector means to the side opening of the tube.

13. Apparatus according to claim 9 wherein the hopper bottom includes two side walls thereof converging downwardly and inwardly in a v-shape to an apex thereof and wherein the duct includes a tube having said feed end comprising an opening at a lower end of the tube on one side of the tube and connector means connecting the lower end of the tube to one side of the hopper bottom, said one side of the bottom hopper having an opening therethrough communicating through the connector means to the side opening of the tube.

14. Apparatus according to claim 13 wherein an end face of the tube is closed and is arranged substantially at the apex and means for providing an opening in the end face of the tubes for cleaning out the tube.

15. Apparatus according to claim 9 wherein the transport means of the first duct comprises an auger flight mounted in the duct for rotation about a longitudinal axis thereof.

16. Apparatus according to claim 9 wherein both the transport means of the first and second ducts comprises an auger flight extending along the duct from the feed end thereof to the discharge spout thereof and rotatable about a longitudinal axis thereof.

* * * * *